US011860665B2

(12) United States Patent
Dorn et al.

(10) Patent No.: US 11,860,665 B2
(45) Date of Patent: Jan. 2, 2024

(54) ADAPTIVER JOYSTICK

(71) Applicant: elobau GmbH & Co. KG, Leutkirch (DE)

(72) Inventors: Jürgen Dorn, Argenbuehl-Eisenharz (DE); Ulrich Morent, Leutkirch (DE)

(73) Assignee: ELOBAU GMBH & CO. KG, Leutkirch (DE)

( * ) Notice: Subject to any disclaimer, the term of this patent is extended or adjusted under 35 U.S.C. 154(b) by 0 days.

(21) Appl. No.: 17/841,214

(22) Filed: Jun. 15, 2022

(65) Prior Publication Data

US 2022/0404856 A1 Dec. 22, 2022

(30) Foreign Application Priority Data

Jun. 18, 2021 (DE) ........................ 102021115884.2

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2009/04766* (2013.01)

(58) Field of Classification Search
None
See application file for complete search history.

(56) References Cited

U.S. PATENT DOCUMENTS

| | | | | |
|---|---|---|---|---|
| 6,437,771 | B1 * | 8/2002 | Rosenberg | A63F 13/245 345/161 |
| 6,501,459 | B1 * | 12/2002 | Takigawa | G06F 3/016 345/161 |
| 6,536,298 | B1 | 3/2003 | Bellur et al. | |
| 7,490,530 | B2 | 2/2009 | Ishikawa et al. | |
| 9,272,889 | B2 | 3/2016 | Guglielmo | |
| 10,118,688 | B2 | 11/2018 | Voiles et al. | |
| 2005/0259075 | A1 | 11/2005 | Ishikawa et al. | |
| 2006/0197741 | A1 | 9/2006 | Biggadike | |
| 2009/0146018 | A1 | 6/2009 | Konig | |
| 2010/0302017 | A1 * | 12/2010 | Guglielmo | B66F 11/04 345/161 |
| 2013/0074631 | A1 * | 3/2013 | Hanlon | B64C 13/48 74/471 XY |

(Continued)

FOREIGN PATENT DOCUMENTS

| | | | |
|---|---|---|---|
| DE | 202005015434 | U1 | 2/2007 |
| DE | 102019115329 | A1 | 12/2020 |
| DE | 102020104810 | A1 | 2/2021 |

(Continued)

*Primary Examiner* — Vicky A Johnson
(74) *Attorney, Agent, or Firm* — Dickinson Wright PLLC

(57) ABSTRACT

An active operating module comprising an operating lever that is pivotably mounted about at least one pivot axis and for each of the at least one pivot axis at least one first active actuating force module, which generates a torque acting on the operating lever, against which a user has to deflect the operating lever out of a rest position. The at least one first active actuating force module is arranged below the at least one pivot axis and is effectively connected directly to the operating lever by a transmission. The active operating module further comprises at least two first active actuating force modules, wherein these comprise in particular a conical region and are arranged at a 90° angle to one another.

6 Claims, 2 Drawing Sheets

(56) References Cited

U.S. PATENT DOCUMENTS

2016/0252926 A1 9/2016 Gomolko et al.

FOREIGN PATENT DOCUMENTS

| | | | |
|---|---|---|---|
| FR | 3051928 | A1 | 12/2017 |
| WO | 2008061111 | A2 | 5/2008 |
| WO | 2008061111 | A3 | 7/2008 |
| WO | 2014096773 | A1 | 6/2014 |

* cited by examiner

ADAPTIVER JOYSTICK

This U.S. patent application claims the benefit of German Patent Application No. DE 10 2021 115 884.2, filed Jun. 18, 2021, the entire contents of which are incorporated herein by reference for all purposes.

BACKGROUND

1. Technical Field

The present invention relates to an adaptive, modular operating module in a particularly compact design.

2. Related Art

Unlike other vehicles, driver cabins of off-highway and commercial vehicles, such as for example agricultural machinery, do not comprise an instrument panel with extensive space available for operating devices. Instead, such vehicles regularly comprise driver seats with an armrest arranged thereon, in which the operating elements most frequently needed for operating the said commercial vehicle are arranged. Here, the operating elements usually comprise an operating lever that is accessible to a user and function assemblies concealed in the armrest which are not accessible to the said user. Driver cabins and armrest are designed so as to be compact in order to have available as much vehicle space for utility purposes or machines connected to the vehicle and in order to make possible the least impairment of the field of vision of the operator to the outside.

These spatial restrictions are a major challenge in particular for adaptive operating modules since these require a lot of space within the operating module for functions such as an actuating force generator, brake force generator or damping force generator. The assemblies necessary for this purpose additionally have to generate such high forces so that a user on his operating lever receives a corresponding feedback which goes beyond a simple vibration. Brake force, actuating force or damper modules are thus significantly more space-intensive.

Adaptive operating modules, considered individually, are thoroughly known from the prior art.

Accordingly, DE 20 2005 015 434 U1 discloses an operating device having an operating lever, in which damping elements can be externally flanged to the control shafts of the operating lever.

From U.S. Pat. No. 9,272,889 B2 a joystick device is known, in which a resetting device is arranged below the pivot axis of the joystick and parallel to the pivot plane.

From DE 10 2019 115 329 A1 an operating device is known, which comprises a joystick which is mounted in a housing in the region of its pivot plane and comprises shafts about which the joystick is pivotable. In this region, an actuator device is provided for each pivot axis, which is axially connected to extensions of the shafts of the joystick and subjects the joystick to torques.

From U.S. Pat. No. 6,536,298 B1 a modular operating device having a joystick is known, wherein the joystick is pivotably mounted on a shaft. The shaft is substantially enclosed by a housing, wherein the ends protrude out of the housing and into further housings, in which in turn resetting and/or damping modules acting on the shaft are arranged.

From US 2009/0146018 A1 an operating device is known which comprises a joystick mounted pivotably about two pivot axes, which joystick for this purpose is mounted on shafts to which in each case an actuator is connected axially.

These known devices each have the disadvantage that a particularly wide substructure of the joystick is needed for the arrangement of the resetting and damping devices, and these devices are therefore especially suited for instrument panels.

SUMMARY

The present invention is therefore based on the object of proposing a particularly space-saving yet modular arrangement of an operating device having a joystick which is also suitable for narrower places of installation such as an armrest for off-highway and commercial vehicles.

This object is solved through an adaptive operating module comprising an operating lever pivotably mounted about two pivot axes and for each of the pivot axes at least one first active actuating force module which generates a torque acting on the operating lever, against which a user has to deflect the operating lever out of its rest position, wherein the at least one first active actuating force module is arranged below the pivot axes and is effectively connected directly to the operating lever via a transmission, wherein the device comprises at least two first active actuating force modules, wherein these comprise a conical region and are arranged at a 90° angle to one another.

The operating lever according to the invention is preferably mounted so as to be pivotable about one or two pivot axes, wherein the pivot axes define a pivot plane. At one end, the operating lever is mounted in a housing or an armrest in which the actuating force modules and the transmission are located. For each pivot axis, at least one first active actuating force module is provided, which is effectively connected to the operating lever in such a manner that it exerts a torque directed coaxially to the pivot axis on the operating lever. According to the invention, there is a direct connection between each of the first active actuating force modules and the operating lever by means of a transmission. According to the invention, first active actuating force module and transmission are arranged below the pivot plane defined by the pivot axes, which pivot plane is defined by the pivot axes. When the operating lever is pivotably mounted merely about one pivot axis, the pivot plane according to the invention is defined as that plane which, in its zero position, stands orthogonally on the longitudinal axis of the operating lever and in which the pivot axis is located.

This actuating force according to the invention primarily serves as resetting force, against which a deflection of the operating lever takes place, however also in order to bring about, reinforce or facilitate such a deflection in certain application cases. In the following, both terms are therefore used, wherein a resetting module always has to be interpreted also as actuating force module. The active actuating force module of the invention is designed according to the invention so that it primarily generates an actuating force against which a user has to deflect the operating lever out of its rest position. Here, the profile of the angle-dependent actuating force curve is variably adjustable by the manufacturer, so that pressure points, force ramps, index steps etc. can be realised, consequently linear and non-linear curve profiles. The torque of the actuating force module can be the only one which acts on the operating lever or to which that of a passive resetting module such as for example a leg spring is added. According to the invention, the torque of the actuating force module however can be designed so as to oppose that of a passive resetting module, so that the resulting angle-dependent total torque is thus below that of the passive resetting module.

This advantageous arrangement of the first active actuating force modules below the pivot plane is also made possible by the transmission. The first active actuating force modules are preferentially arranged below the operating lever in a compact manner, so that the device is extended in particular in the vertical direction, i.e. perpendicularly to the pivot axis, while it is a particularly small structure in particular parallel to the pivot axis, in particular does not protrude over a region oriented parallel to the pivot plane defined by the maximum deflections of the pivot lever. The region round about the operating lever within an armrest is particularly valuable seen in ergonomic terms. Accordingly, these regions are not occupied by the installation space of the device because of the design of these regions according to the invention. Through the vertically dominated design the device is also easily scalable, so that it is suitable also for smaller joysticks such as for example front loader joysticks or larger joysticks, which require smaller and larger torques respectively and thus smaller and larger actuating force modules respectively. Further, a modularity for each pivot axis is provided in this device according to the invention. Thus it is according to the invention that an operating lever that is pivotably mounted about a single pivot axis in the X direction is equipped with a first active actuating force module, which generates a torque in the direction of the X pivot axis. If this device is to be now expanded so that a deflection of the operating lever about two pivot axes becomes possible, i.e. in the X and Y directions, a further first active actuating force module is integrated in the device according to the invention, which then generates a torque in the direction of the Y pivot axis. The respective associated transmission is provided according to the invention either for two first active actuating force modules combined, or separately and has to be suitably added during the expansion. This modularity according to the invention also exists toward a reduction of the pivot axes, i.e. by removing a first active actuating force module and the corresponding transmission.

When the device comprises exactly two first active actuating force modules, one each of the first active actuating force modules is preferentially effectively connected to a pivot axis of the operating lever and arranged relative to the pivot axis in such a manner that a particularly simple transmission such as for example a gearwheel or toothed belt can be employed. With another arrangement according to the invention, the transmission conducts the force transmission via an angle. The arrangement of the first active actuating force modules at a 90° angle to one another according to the invention also corresponds to the orientation of the pivot axes of the operating lever. Because of the conical region of the first active actuating force modules, these contact one another and lie as tightly as possible against one another. Such an arrangement allows a large volume of the first active actuating force modules without exceeding the space limitation due to the installation. A large volume of the first active actuating force modules—among others in the form of MRF modules, electric motors or lifting magnets—is particularly relevant since a larger volume makes possible generating a greater torque.

As a further development of the invention, it is provided that transmission and first active actuating force module are configured in such a manner that the torque acting on the operating lever is between 1 and 10 Nm. For this, the first active actuating force module is equipped with as large as possible a volume while the transmission amplifies the torque emanating from the first active actuating force module to the operating lever in particular by a factor of 2 to 3. Torque ranges from 1 to 10 Nm additionally make possible a variable use of the device as drive and main joystick of off-highway and commercial vehicles without being dependent in the process on further installation space in particular with the design mentioned above.

As configuration of the invention it is provided that it further comprises a passive resetting unit, which returns the operating lever into a zero position. The passive resetting unit is preferentially decoupled from the active actuating force modules and cannot be directly influenced by a user, so that the passive resetting unit acts on the operating lever at any time and exerts a force on the same in the direction of its zero position. Thus, by way of the active actuating force modules, the operating lever can be influenced entirely individually for example in its force feedback behaviour or a blocking of individual directions while through the passive resetting unit merely a basic resetting force on the operating lever is generated in the direction of the zero position. This is advantageous in particular upon a failure of the active actuating force modules since the safe state of the zero position is achieved despite an error, for example of the motor, in the case of which the system current is switched off. Here, the passive resetting unit is configured so that it overcomes the friction of the operating lever.

As a further development of the invention it is provided that the passive resetting unit is formed as a spring, in particular as a leg spring, and/or acts on the operating lever in the region of the at least one pivot axes. A spring is a particularly simple and cost-effective form of a passive resetting unit. Here, leg springs are particularly suited in particular for angular or rotary movements such as occur in the case of the operating lever, since these, when the operating lever is pivoted, absorb a torque through suitable mouldings on the operating lever, which engage in the legs of the leg spring, which torque they pass on again to the operating lever directly or via the mouldings upon relaxation. When the spring, in the region of the at least one pivot axis, acts on the operating lever, no further transmission is necessary and a particularly compact design is made possible. Alternatively, the passive resetting unit can also be designed as tension, compression or air spring. In a configuration of the invention, it is provided that for each pivot axis of the operating lever it comprises a second active actuating force module which generates a second torque that is superimposed on the torque of the first active actuating force module acting on the operating lever. The second active actuating force module can, because of this superposition, can carry out additional functions and generate a torque other than the first active actuating force module. According to the invention, the second active resetting module causes smaller effects such as for example a vibration alarm, other force feedback effects or acts as track holding assistant, by way of which the operating lever is forced in a certain direction. While the first active actuating force module is provided in particular for larger torques, the second active actuating force module without transmission or other reinforcement of the torque generated by the actuating force module is according to the invention Thus, it can be effectively connected directly to the operating lever, but also to the transmission or to the first active actuating force module.

As a further development of the invention it is provided that the second active actuating force module has a smaller construction volume than the first active actuating force module corresponding thereto. Since the second active actuating force module according to the invention is provided in particular for tasks in which torques are needed that are lower than those for the active actuating force module, the second active actuating force module can be configured more compact, in particular more compact than the first one. In particular, the diameter of the same is approximately two to three times smaller than that of the first one and its length approximately three to four times shorter than that of the first actuating force module, in particular resetting force module.

As a configuration of the invention, it is provided that the first and/or second active actuating force module is selected from the group formed by radial MRF module, linear MRF module, electric motor, lifting magnet, shape memory alloy and other active actuators. Such actuating force modules are suitable in particular for the active, individual control. Accordingly, a wide range of modes are possible with the corresponding software, such as for example blockage, vibration, variable resetting force, the previously mentioned modes individually for certain deflection directions or intensities. Here, the previously mentioned listing of the possible modes should not be considered conclusive.

As a further development of the invention, it is provided that the transmission is selected from the group formed by gear, toothed belt, chain, linkage with ball head. Such forms of the transmission constitute in particular simple and compact alternatives which correspond to the compact design of the device according to the invention.

In a preferred embodiment the invention is exemplarily described making reference to a drawing, wherein further advantageous details can be taken from the drawing.

Parts having the same effect where provided with a common reference number.

DETAILED DESCRIPTION OF EXAMPLE EMBODIMENTS

Figure 1:
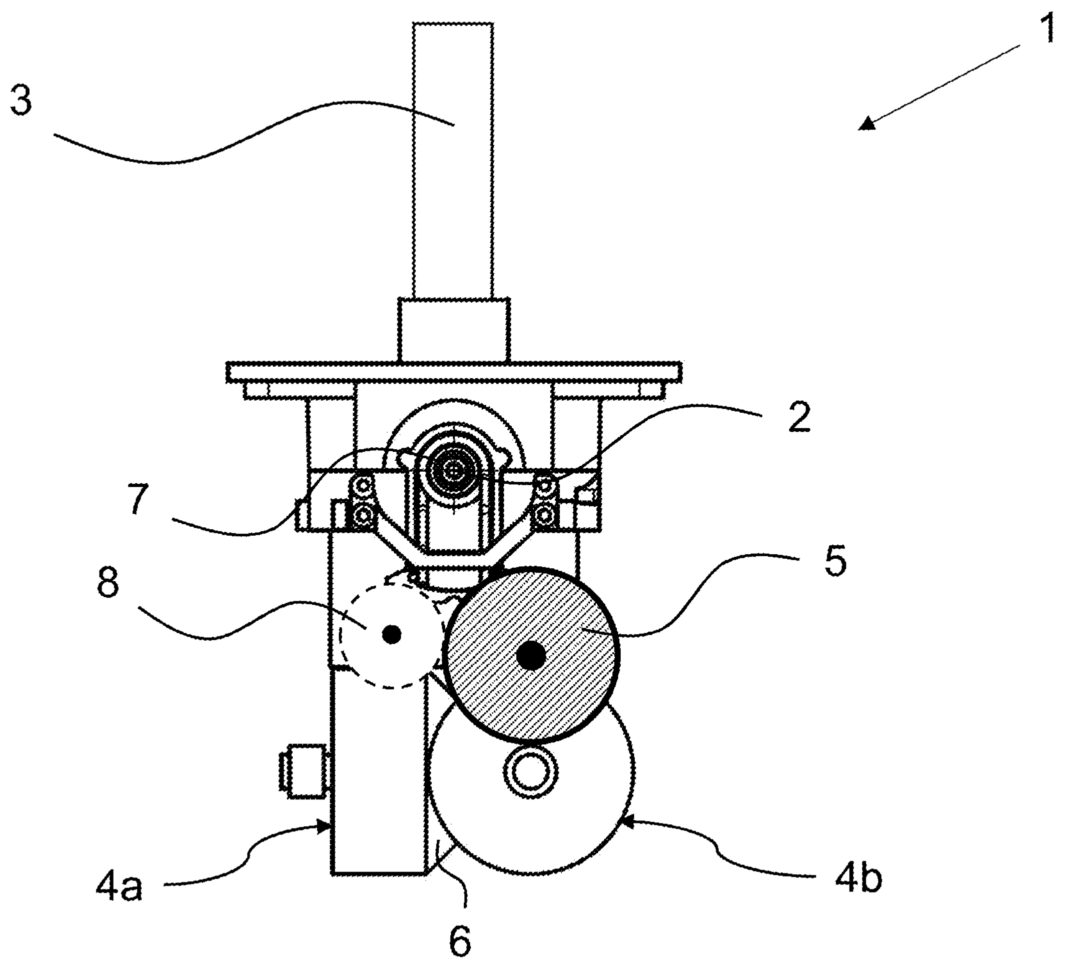
FIG. 1 a schematic representation of an adaptive operating module according to the invention in a preferred embodiment in a lateral view and FIG. 2 a schematic representation of an adaptive operating module according to the invention in a preferred embodiment in a view from below and FIG. 3 a schematic representation of the possible angle-dependent torque curves.

FIG. 1 shows a schematic representation of an adaptive operating module 1 according to the invention in a preferred embodiment in lateral view. The operating lever 3 enclosed by a lever sack is located at the upper end, which operating lever 3 at a free end can be gripped by a user. In the region of its second end located opposite the free end, the operating lever 3 is pivotably mounted. In the shown exemplary embodiment, the operating lever 3 is pivotably mounted about two pivot axes 2. Here, the first pivot axis 2 in the representation plane of the figure is located perpendicularly to the image plane and the second pivot access in the image plane, wherein both pivot axes 2 are additionally oriented perpendicularly to the operating lever 3 in its zero position shown here. The pivot axes 2 define a pivot plane which, just like the pivot axes 2, is oriented perpendicularly to the operating lever 3 in its zero position. The operating lever 3 can reach as far as to the pivot plane and contact the same or protrude downwards beyond the pivot plane, penetrating the same. For each pivot axis 2, the adaptive operating module 1 comprises a first active actuating force module 4*a* 4*b*, which in the operating state generates a torque which in the shown case is indirectly transmitted to the operating lever 3 and thus acts on the same in a desired force feedback or other function. For transmitting the torques generated by the first active actuating force modules 4*a* 4*b* to the operating lever 3 a transmission 5 is provided, which effectively connects the first active actuating force modules 4 to the operating lever 3. In addition, the transmission 5 according to the invention amplifies the respective torque so that a larger construction volume of the first active actuating force modules 4 normally required for a greater torque is avoided and a more compact design of the adaptive operating module 1 made possible. In addition, for a particularly simple form of the transmission 5, a second transmission 5 for the second of the first active actuating force modules 4*a*4*b* is according to the invention, but which is not shown here. Because of the transmission 5, particularly great torques act on the operating lever 3, originating from the first active actuating force modules 4*a* 4*b*. A second active actuating force module 8 is provided, which generates a torque which is superimposed on the torque of the first active actuating force modules 4*a* 4*b* and likewise acts on the operating lever 3. This second active actuating force module 8 is configured significantly smaller since it is to only generate smaller torques. These smaller torques mainly fulfil smaller tasks such as for example a vibration alarm. The tasks requiring greater forces such as for example the blockage of certain deflections of the operating lever are assumed by the first active actuating force modules 4*a* 4*b*. In addition, it is according to the invention that the second active actuating force module 8 is effectively connected to the operating lever 3 via a transmission 5, or even via the same transmission 5 as the first active actuating force modules 4*a* 4*b* and so that the torque generated by the second active actuating force module 8 is likewise amplified by a transmission 5. It is likewise according to the invention that the adaptive operating module 1 for each axis comprises a second active actuating force module 8. This is not shown in the shown embodiment either. For a particularly advantageous compact design, the first active actuating force modules 4*a* 4*b* and the transmission 5, but also the second active actuating force module 8 are arranged vertically below the operating lever 3 and in particular below the pivot plane defined by the pivot axes 2. In the shown embodiment, a passive resetting unit 7 in the form of a leg spring is arranged in the region of the pivot axes 2 of the operating lever and acts on the same in such a manner that the passive resetting unit 7 returns the operating lever 3 into its zero position even in the absence of power supply of the adaptive operating module 1.

Figure 2:
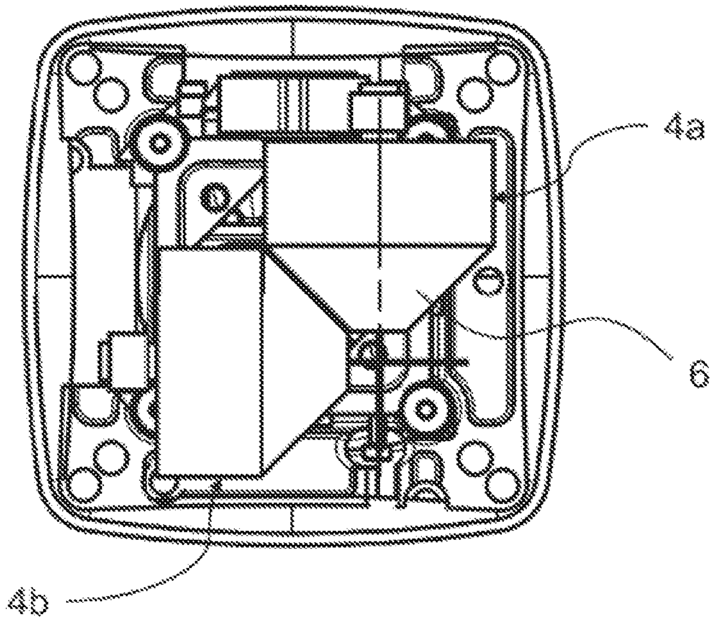

FIG. 2 shows a schematic representation of an adaptive operating module 1 according to the invention in a preferred embodiment in a view from below. The shape a the first active actuating force modules 4*a* 4*b* is particularly succinctly noticeable. In the shown embodiment, these are arranged so as to contact one another in order to save as much installation space as possible. In addition, the first active actuating force modules 4*a*, 4*b* each comprise a conical region 6 by way of which they can be arranged so as to contact one another in a particularly compact manner. In addition, a maximum construction volume is made possible through the conical region 6 despite the minimal installation space claimed, wherein the torque that can be generated by the first actuating force module 4*a* 4*b* is dependent on the construction. volume.

Accordingly, a good compromise between a compact design and a generation of such high torques can be achieved through such a configuration and arrangement of the first active actuating force modules 4*a* 4*b* which, at least combined with as compact as possible a transmission 5, also make possible force feedback functions such as for example a blocking of the lever movement.

Figure 3:
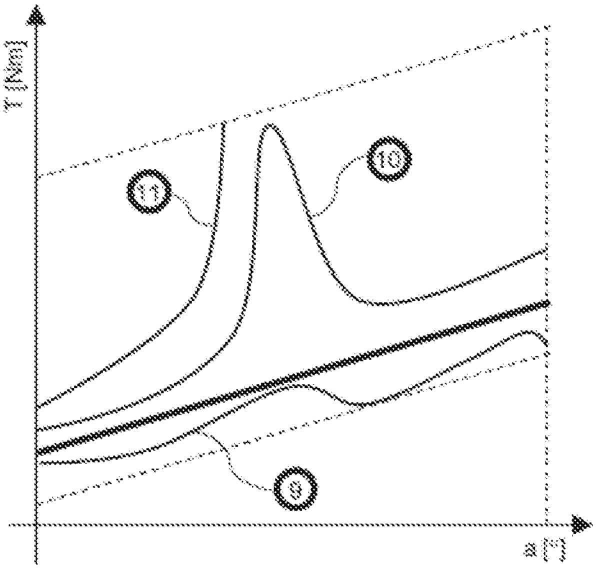

FIG. 3 shows a schematic representation of possible torque curves as a function of the deflection angle α in ° of the operating lever on the abscissa and of the torque T in Nm on the ordinate. The maximum value of the abscissa is given by the maximum mechanically possible deflection of the operating lever, while the maximum possible ordinate values are given by the maximum achievable torque T from the addition of those from active actuating force module and passive resetting unit.

The continuous line with linear rise, which is not marked, reflects the torque curve of the passive resetting unit. The dotted line shifted parallel thereto in the direction of the ordinate reflects the minimum possible torque curve which is obtained by exclusive subtraction of the maximum torque of the active actuating force module from that of the passive resetting module. A first non-linear curve 9 runs between both, which is obtained by a subtraction of a variable torque of the active actuating force module from that of the passive resetting unit. Such a profile can be desirable when for example the reaching of an idle run portion of an implement is to be signalled to an operator and the end of the same.

The second non-linear curve 10 is obtained by adding a variable torque of the active actuating force module to that of the passive resetting unit. The curve profile exemplarily reflects a pressure point to be overcome by an operator, while multiple pressure points along the deflection angle α, spaced evenly or distinctly apart from one another in α, equally or distinctly high in T would also be according to the invention.

The third non-linear curve 11 is obtained by a non-linear maximum addition of the torque of the active actuating force module and simulates to a user the mechanical deflection limitation of the operating lever of the joystick. This can be desirable in particular when even small deflection movements already make possible sufficiently precise controls.

The invention claimed is:

1. An adaptive operating module comprising an operating lever that is pivotably mounted about two pivot axes and for each of the pivot axes at least one first active actuating force module, which generates a torque acting on the operating lever against which a user has to deflect the operating lever out of a rest position, wherein the at least one first active actuating force module is arranged below the pivot axes and is directly effectively connected to the operating lever by a transmission, and further comprising at least two first active actuating force modules, wherein the first active actuating force modules comprise a conical region and are arranged at a 90° angle to one another.

2. The adaptive operating module according to claim 1, wherein the transmission and the first active actuating force module are configured in such a manner that the torque acting on the operating lever is between 1 and 10 Nm.

3. The adaptive operating module according to claim 1, further comprising a passive resetting unit which returns the operating lever into a zero position.

4. The adaptive operating module according to claim 3, wherein the passive resetting unit is designed as a spring, and/or acts on the operating lever in the region of the pivot axes.

5. The adaptive operating module according to claim 1, further comprising for each pivot axis of the operating lever a second active actuating force module, which generates a second torque acting on the operating lever, that is superimposed on the torque of the first active actuating force module.

6. The adaptive operating module according to claim 5, wherein the second active actuating force module has a smaller construction volume than the first active actuating force module corresponding thereto.

* * * * *